United States Patent
Krishan et al.

(10) Patent No.: US 12,323,316 B2
(45) Date of Patent: Jun. 3, 2025

(54) METHODS, SYSTEMS, AND COMPUTER READABLE MEDIA FOR SERVICE COMMUNICATION PROXY (SCP) ROUTING

(71) Applicant: Oracle International Corporation, Redwood Shores, CA (US)

(72) Inventors: Rajiv Krishan, Bangalore (IN); Sonal Jain, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 283 days.

(21) Appl. No.: 17/710,923

(22) Filed: Mar. 31, 2022

(65) Prior Publication Data

US 2023/0318960 A1 Oct. 5, 2023

(51) Int. Cl.
*H04L 45/02* (2022.01)
*H04L 45/00* (2022.01)

(52) U.S. Cl.
CPC ............... *H04L 45/02* (2013.01); *H04L 45/34* (2013.01)

(58) Field of Classification Search
CPC ................................. H04L 45/02; H04L 45/34
See application file for complete search history.

(56) References Cited

U.S. PATENT DOCUMENTS

| | | | |
|---|---|---|---|
| 11,864,093 | B2 | 1/2024 | Srivastava et al. |
| 2021/0306326 | A1 | 9/2021 | Bykampadi et al. |
| 2022/0086734 | A1 | 3/2022 | Aggarwal et al. |
| 2023/0188625 | A1* | 6/2023 | Rodrigo ................. H04L 67/51 709/238 |
| 2023/0217355 | A1 | 7/2023 | Srivastava et al. |
| 2023/0254381 | A1* | 8/2023 | Rodrigo ............... H04L 67/562 709/224 |
| 2023/0388230 | A1 | 11/2023 | Krishan |
| 2024/0022996 | A1* | 1/2024 | Lu ....................... H04W 40/248 |

OTHER PUBLICATIONS

"3rd Generation Partnership Project; Technical Specification Group Core Network and Terminals; 5G System; Technical Realization of Service Based Architecture; Stage 3 (Release 17)," 3GPP TS 29.500, V17.5.0, pp. 1-117 (Dec. 2021).

(Continued)

*Primary Examiner* — Mansour Oveissi
(74) *Attorney, Agent, or Firm* — Jenkins, Taylor & Hunt, P.A.

(57) ABSTRACT

Methods, systems, and computer readable media for service communication proxy (SCP) routing are disclosed. One example method for SCP routing comprises: at a first SCP associated with a first domain, the first SCP including at least one processor: receiving a first request destined for a network function; determining that the first request lacks routing path information for the first request; generating, using SCP domain routing information obtained from a network function repository function (NRF), a sequence of domains usable for routing the first request to the network function; adding, to the first request, the routing path information indicating the sequence of domains; determining, using the routing path information or the sequence of domains, a second SCP for routing the first request; and sending the first request comprising the routing path information to the second SCP.

18 Claims, 7 Drawing Sheets

(56) References Cited

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

"3rd Generation Partnership Project; Technical Specification Group Core Network and Terminals; 5G System; Principles and Guidelines for Services Definition; Stage 3 (Release 17)," 3GPP TS 29.501, V17.4.1, pp. 1-79 (Dec. 2021).

Fielding et al., "Hypertext Transfer Protocol (HTTP/1.1): Message Syntax and Routing," Internet Engineering Task Force (IETF), pp. 1-89 (Jun. 2014).

Notice of Allowance and Fee(s) Due for U.S. Appl. No. 17/569,319 (Aug. 25, 2023).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

\* cited by examiner

METHODS, SYSTEMS, AND COMPUTER READABLE MEDIA FOR SERVICE COMMUNICATION PROXY (SCP) ROUTING

TECHNICAL FIELD

The subject matter described herein relates to improving communications in fifth generation (5G) and subsequent generation communications networks. More particularly, the subject matter described herein relates to methods, systems, and computer readable media for service communication proxy (SCP) routing.

BACKGROUND

In fifth generation (5G) telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with an NF repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required services or directly routes the traffic to the destination producer NF instances.

SUMMARY

Methods, systems, and computer readable media for service communication proxy (SCP) routing are disclosed. One example method for SCP routing comprises: at a first SCP associated with a first domain, the first SCP including at least one processor: receiving a first request destined for a network function; determining that the first request lacks routing path information for the first request; generating, using SCP domain routing information obtained from a network function repository function (NRF), a sequence of domains usable for routing the first request to the network function; adding, to the first request, the routing path information indicating the sequence of domains; determining, using the routing path information or the sequence of domains, a second SCP for routing the first request; and sending the first request comprising the routing path information to the second SCP.

One example system for SCP routing includes at least one processor, a memory, and a first SCP including the at least one processor and the memory. The first SCP is associated with a first domain and is configured for: receiving a first request destined for a network function; determining that the first request lacks routing path information for the first request; generating, using SCP domain routing information obtained from a network function repository function (NRF), a sequence of domains usable for routing the first request to the network function; adding, to the first request, the routing path information indicating the sequence of domains; determining, using the routing path information or the sequence of domains, a second SCP for routing the first request; and sending the first request comprising the routing path information to the second SCP.

One example non-transitory computer readable medium comprising computer executable instructions embodied in the non-transitory computer readable medium that when executed by at least one processor of at least one computer cause the at least one computer to perform steps comprising: at a first SCP associated with a first domain: receiving a first request destined for a network function; determining that the first request lacks routing path information for the first request; generating, using SCP domain routing information obtained from a network function repository function (NRF), a sequence of domains usable for routing the first request to the network function; adding, to the first request, the routing path information indicating the sequence of domains; determining, using the routing path information or the sequence of domains, a second SCP for routing the first request; and sending the first request comprising the routing path information to the second SCP.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
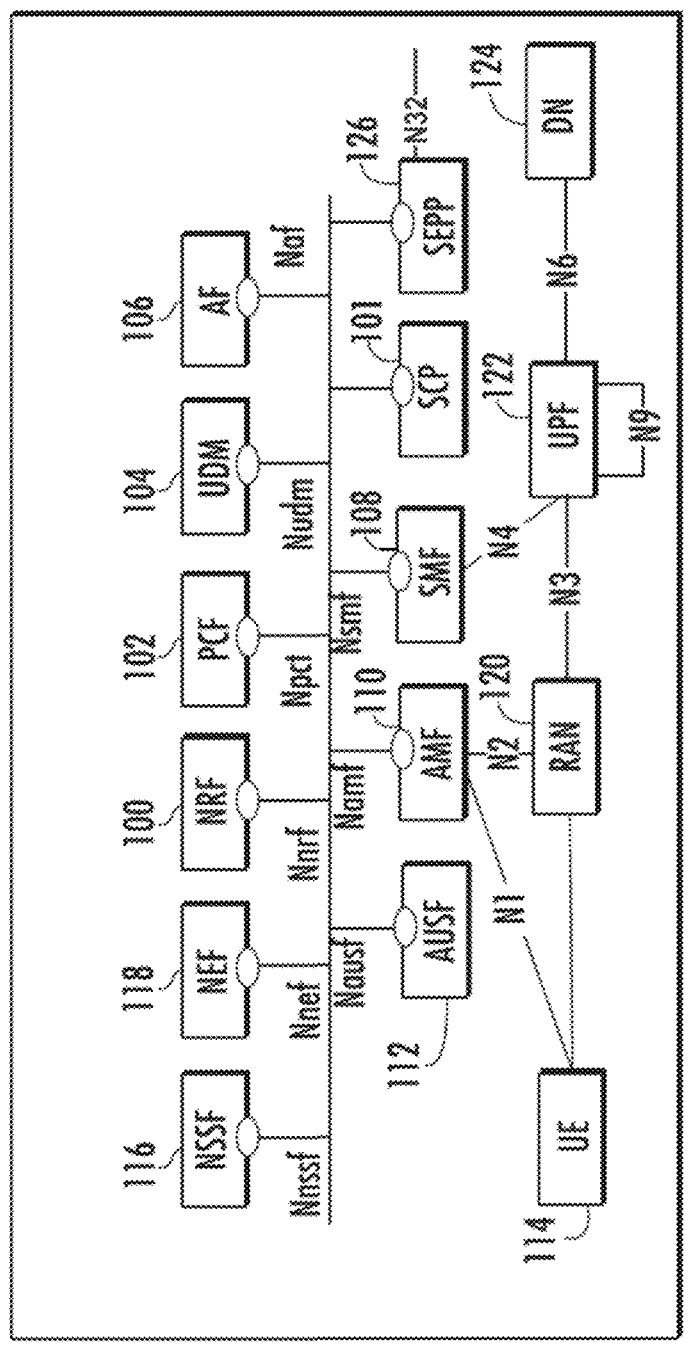
FIG. 1 is a network diagram illustrating an example fifth generation (5G) network architecture.

The subject matter described herein relates to methods, systems, and computer readable media for service communication proxy (SCP) routing. An SCP can route traffic (e.g., service based interface (SBI) requests) from consumer network functions (NFs) to various producer NFs or instances thereof. Depending on size, an operator's network can be logically divided into one or more domains (e.g., network portions) and can be usable for segregating SCP routing. For example, in a network with multiple domains, an SCP may deliver requests destined for producer NFs in a first domain or a second domain, a second SCP may deliver requests destined for producer NFs in a second domain or a third domain and a third SCP may deliver requests destined for producer NFs in the first domain only. In this example, when a request requires inter-domain routing to reach a destination, a request may traverse multiple SCPs before the request can be delivered to the appropriate producer NF.

SCP routing generally requires each SCP to determine an appropriate next hop (e.g., another SCP or the requested producer NF) for a request. When making this routing decision, an SCP may use predefined routing logic that involves performing a reverse lookup to find Nfprofile details of the producer NF (e.g., by using a producer NF's fully qualified domain name (FQDN), a service name (from a target uniform resource identifier (URI) of a request), a service version (from the target URI) and/or an api-prefix (from the target URI) to determine the producer NF's Nfprofile). Based on the Nfprofile, the SCP may determine the SCP domain of the producer NF and query the NRF for SCP domain routing information (i.e., SCPDomainRoutingInfo). The SCP domain routing information may indicate a list of SCP domains and the SCPs that serve particular SCP domains. Hence, when inter-domain routing is needed, the SCP may use the SCP domain routing information to find a next SCP (e.g., by querying the Nnrf_NFDiscovery service of the NRF for an SCP serving the appropriate next domain) for a given request that is in a direct or indirect path to the SCP domain of the requested producer NF. While each SCP can determine an appropriate next hop by obtaining SCP domain routing information from an NRF, it can be inefficient (e.g., causing processing delay, network latency, and/or lower throughput) to require all intermediate SCPs to perform this same routing logic (e.g., determining a next hop/domain by processing the request for evaluating the subsequent domain and analyzing SCP domain routing information obtained from a NRF) when performing inter-domain routing.

In accordance with some aspects of the subject matter described herein, methods, systems, mechanisms, and/or techniques are provided for adding routing path information to a request for use by an SCP in performing inter-domain routing. For example, an initial SCP may determine that a request needs to be routed to another domain (e.g., a domain not handled by the initial SCP) and, in response, the initial SCP may obtain SCP domain routing information (e.g., from the NRF or local data storage) and use that information to determine a routing path (e.g., a sequence of domains that the request can traverse to reach an appropriate producer NF). In this example, the initial SCP may include the routing path information in a header portion of the request, e.g., in a customer header.

In accordance with some aspects of the subject matter described herein, methods, systems, mechanisms, and/or techniques for SCP routing are provided. For example, an SCP may be configured for receiving a request comprising routing path information; determining that the request includes routing path information for the request; determining, using the routing path information and a domain associated with the SCP, a next domain for routing the request; and sending the second request to another SCP associated with the next domain.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing, e.g., inter-domain routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of a fully qualified domain name (FQDN), an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs 126 usable forwarding various communications (e.g., 5GC requests) between a consumer NF and a producer NF after applying application level security protection.

It will be appreciated that FIG. 1 is for illustrative purposes and that various nodes and/or modules, locations, and/or functionality described above in relation to FIG. 1 may be changed, altered, added, or removed.

Figure 2:
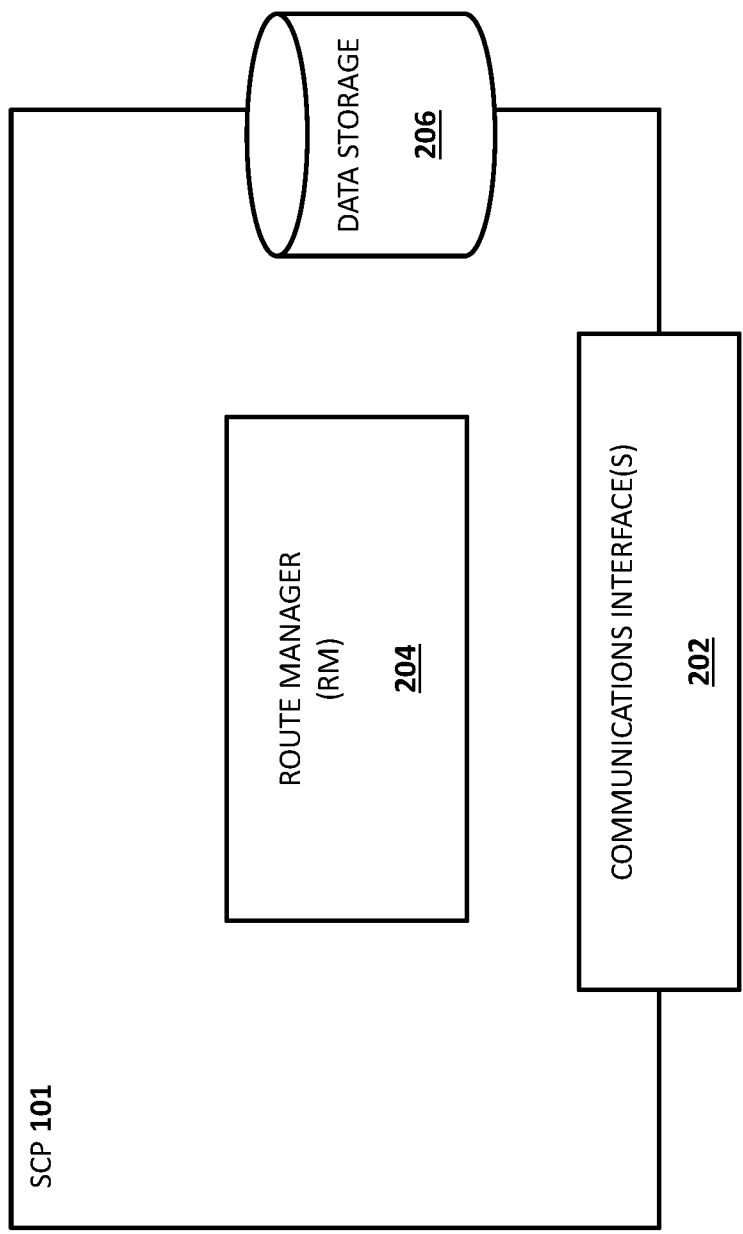
FIG. 2 is a block diagram illustrating an example service communication proxy (SCP) for routing requests between domains.

FIG. 2 is a diagram illustrating an example SCP 101 for routing requests between domains. SCP 101 may represent any suitable entity or entities (e.g., one or more node(s), device(s), or computing platform(s)) for performing various aspects or functionalities described herein, e.g., facilitating communications between consumer NFs and producer NFs. In some embodiments, SCP 101 may include one or more 3GPP defined functions (e.g., NEF 118 or an SCEF) and/or related functionality. In some embodiments, SCP 101 may include an authorization server, a data repository, a network gateway, a machine type communication inter-working function (MTC-IWF), a network proxy, an edge security device, and/or other functionality.

Referring to FIG. 2, SCP 101 may include one or more communications interface(s) 202 for communicating messages via a communications environment, e.g., one or more communications networks. For example, communications interface(s) 202 may include one or more communications interfaces for communicating with other SCPs associated with one or more domains (e.g., logical network portions) and one or more communications interfaces for communicating with various producer NFs.

SCP 101 may include a route manager (RM) 204. RM 204 may be any suitable entity (e.g., software executing on at least one processor) for performing various operations associated with routing messages, e.g., routing requests between SCP domains. For example, RM 204 may be configured for receiving a request (e.g., an SBI request or a hypertext transfer protocol (HTTP) request) for request a service or data from a producer NF and may include routing logic for routing the request toward an appropriate producer NF (e.g., an producer NF (or instance thereof) capable of successfully processing the request).

In some embodiments, SCP 101, RM 204, or another entity may utilize routing path information (e.g., a sequence of domains like "SCP_Domain_1, SCP_Domain_2, SCP_Domain_4") in the request to inform a routing decision, e.g., in lieu or in additional to performing other routing logic. For example, prior to determining a routing path or a next hop for a received request, SCP 101, RM 204, or another entity may first check to see if the request has routing path information (e.g., by checking for a custom "vendor_route_domain" header). In this example, if SCP 101, RM 204, or another entity determines that the request has routing path information, SCP 101, RM 204, or another entity may use the routing path information to identify a next hop (e.g., a next SCP or an appropriate producer NF) for the request.

In some embodiments, to identify a next hop for a request comprising routing path information, SCP 101, RM 204, or another entity may search a sequence of domains (indicated by the routing path information) in a reverse order (e.g., right to left), for the domain that matches the local domain (e.g., a serving domain) of SCP 101. If the local domain of SCP 101 was not found in the sequence of domains, SCP 101, RM 204, or another entity may use other routing logic (e.g., by analyzing SCP domain routing information obtained from NRF 100) to identify an appropriate next hop. If the local domain of SCP 101 was found in the sequence of domains, SCP 101, RM 204, or another entity may determine the next domain in the sequence of domains after the matching domain (e.g., based on original, non-reverse order (e.g., left to right)). If the next domain is found (e.g., the local domain of SCP 101 is not the domain of an appropriate producer NF for handling the request), SCP 101 may identify a next SCP 101 associated with the next domain (e.g., by querying the Nnrf_NFDiscovery service of NRF 100 for an available SCP 101 in the next domain) and then routing the request to the identified next SCP 101. If the next domain is not found (e.g., the local domain of SCP 101 is the last domain in the sequence of domains), SCP 101 may route the request to an appropriate producer NF (within its domain).

In some embodiments, e.g., when a request cannot be directly routed from SCP 101 to a next domain indicated by the sequence of domains, SCP 101, RM 204, or another entity may route to a second SCP 101 that is capable of routing to a third SCP 101 in the next domain.

In some embodiments, e.g., when a routing failure occurs or when a request lacks (valid) routing path information, SCP 101, RM 204, or another entity may add or modify routing path information in a request by generating, using SCP domain routing information obtained from NRF 100, a sequence of domains usable for routing the request to a producer NF and then adding the sequence of domains to the request, e.g., in a customer "vendor_route_domain" header.

In some embodiments, e.g., prior to adding routing path information to a request, SCP 101, RM 204, or another entity may obtain and analyze SCP domain routing information from NRF 100, e.g., via an SCPDomainRoutingInfoGet or SCPDomainRoutingInfoSubscribe service. For example, in a multi-domain network, each SCP 101 may register or publish their local/serving domain(s) and their inter-domain routing capabilities (e.g., via an scpDomains parameter of its NFProfile) with NRF 100. In this example, assume three registered SCPs 101, SCP x, SCP y, and SCP z, in the network have routing capabilities as follows:

```
SCP x Profile includes: { "scpDomains": [ "SCP_Domain_1",
"SCP_Domain_2" ] }
SCP y Profile includes: { "scpDomains": [ "SCP_Domain_2",
"SCP_Domain_3" ] }
SCP z Profile includes: { "scpDomains": [ "SCP_Domain_4" ] }.
```

Continuing with this example, SCP 101 may request from or subscribe with NRF 100 to obtain SCP domain routing information indicating a map of SCP domain interconnection information, where the key of the map is a SCP domain. The value of each entry shall be the interconnectivity information of the SCP domain indicated by the key. For example, SCP domain routing information may include or indicate:

```
"scpDomainList": {
"SCP_Domain_1": { "connectedScpDomainList":
[ "SCP_Domain_2" ] },
"SCP_Domain_2": { "connectedScpDomainList":
[ "SCP_Domain_1",
"SCP_Domain_3" ] },
"SCP_Domain_3": { "connectedScpDomainList":
[ "SCP_Domain_2" ] },
"SCP_Domain_4": { "connectedScpDomainList": [ ] }
}.
```

Additional details related to SCP domain routing information and related procedures for obtaining such information is discussed in 3GPP TS 29.510; 3rd Generation Partnership Project; Technical Specification Group Core Network and Terminals; 5G System; Network Function Repository Services; Stage 3 (Release 17); V17.2.0 (2021-12).

In some embodiments, SCP 101, RM 204, or another entity may receive, store, and/or utilize SCP domain routing information to derive a routing path from the SCP's local domain to the domain of a request's destination (e.g., an producer NF that can successfully process the request). For example, when deriving or determining a routing path for a request (that does not have routing path information), SCP 101, RM 204, or another entity may identify the destination of the request (e.g., a producer NF) and may determine whether the destination is within the SCP's connected domain(s). If the destination is within the SCP's connected domain(s), SCP 101, RM 204, or another entity may route the request to the destination without sending the request to another SCP 101. However, if the destination is in a different domain (e.g., a domain that is not one of the SCP's connected domain(s)), SCP 101, RM 204, or another entity may use obtained SCP domain routing information to determine a domain path that allows the request to reach the domain of the destination. For example, using the example "scpDomainList" data shown above, an initial SCP 101 associated with "SCP_Domain_1" may determine that a producer NF for processing a given request is in "SCP_Domain_3" and may also determine that "SCP_Domain_3" is routable from "SCP_Domain_2" only. In this example, SCP 101 may use this knowledge to generate a sequence of domains indicating "SCP_Domain_1, SCP_Domain_2, SCP_Domain_3" and then may include this sequence of domains in the request (e.g., as "vendor_route_domain" header information) prior to routing the request to a next hop (e.g., an SCP associated with "SCP_Domain_2").

In contrast to SCP 101, RM 204, or another entity that adds and/or using routing path information as described above, a conventional SCP 101 lacking such capabilities may be unaware of routing path information in requests and, as such, may determine, for each received request, a next hop based on SCP domain routing information obtained from NRF 100. For example, using the example "scpDomainList" data shown above, a conventional SCP 101 (lacking methodologies or techniques described herein) associated with "SCP_Domain_1" may receive a request, determine that a producer NF for processing the request is in "SCP_Domain_3", and determine that "SCP_Domain_3" is routable from "SCP_Domain_2" only. In this example, conventional SCP 101 may find or attempt to find a direct or indirect routing path to "SCP_Domain_2" and, once an appropriate SCP 101 is found that serves "SCP_Domain_2", conventional SCP 101 may send the request onward to the next SCP 101 without providing or including routing information in the request. In this example, since routing path information is not propagated with the request, the receiving SCP 101 would need to perform a similar procedure to discover the next hop.

In some embodiments, SCP 101, RM 204, or another entity may access (e.g., read from and/or write information to) data storage 206. Data storage 206 may be any suitable entity (e.g., a computer readable medium or memory) for storing routing logic, SCP domain routing information, SCP connectivity mappings, and/or other data. In some embodiments, data storage 206 may include a SCP connectivity data store for sending requests to SCPs or related domains. In some embodiments, data storage 206 may include logic for performing various aspects associated with SCP functions, e.g., including logic for endpoint selection and/or related routing.

It will be appreciated that FIG. 2 and its related description are for illustrative purposes and that SCP 101 may include additional and/or different modules, components, or functionality.

Figure 3:
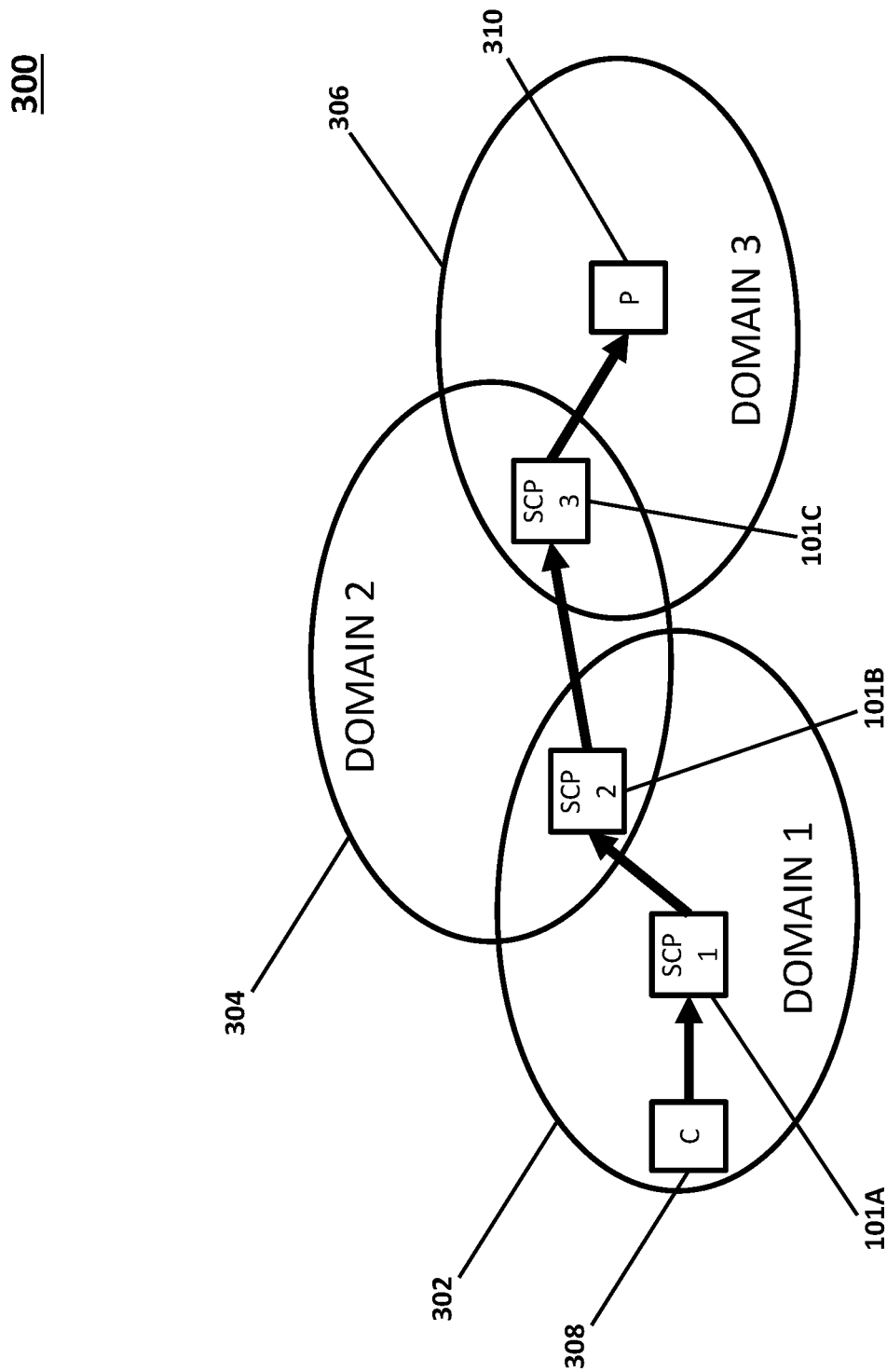
FIG. 3 depicts SCPs and related domains associated with a first network configuration.

FIG. 3 depicts SCPs and related domains associated with a first network configuration 300. As depicted in FIG. 3, network configuration 300 may represent a network with multiple domains (e.g., SCP domains) for SCP routing purposes, including domain 1 302, domain 2 304, and domain 3 306. Each of domains 302-306 may represent a logical network portion and may be associated with one or more of SCPs 101A-101C. For example, SCPs 101A-101C may be configured to route traffic to producer NFs or other entities (e.g., other SCPs 101) within its local domain(s), also referred to herein as serving domain(s).

Referring to network configuration 300, domain 302 includes a consumer NF (labeled as 'C') 308 and is served by SCP 101A and SCP 101B; domain 304 is served by SCP 101B and SCP 101C; and domain 306 includes a producer NF (labeled as 'P') 310 and is only served by served by SCP 101C. In other words, as depicted in FIG. 3, SCP 101A is connected to domain 304, SCP 101B is connected to domain 302 and domain 304, SCP 101C is connected to domain 304 and domain 306.

Assuming SCPs 101A-101C and their domain connectivity information as depicted in FIG. 3 are registered with NRF 100, representative SCP domain routing information from NRF 100 may include or indicate an "scpDomainList" resource or object as follows:

```
"scpDomainList": {
  "DOMAIN 1": { "connectedScpDomainList":
  [ "DOMAIN 2" ] },
  "DOMAIN 2": { "connectedScpDomainList":
  [ "DOMAIN 1", "DOMAIN 3" ] },
  "DOMAIN 3": { "connectedScpDomainList":
  [ "DOMAIN 2" ] },
}.
```

It will be appreciated that FIG. 3 is for illustrative purposes and that different and/or additional SCPs 101 than SCPs 101A-101C depicted in FIG. 3 may be usable for routing service requests.

Figure 4:
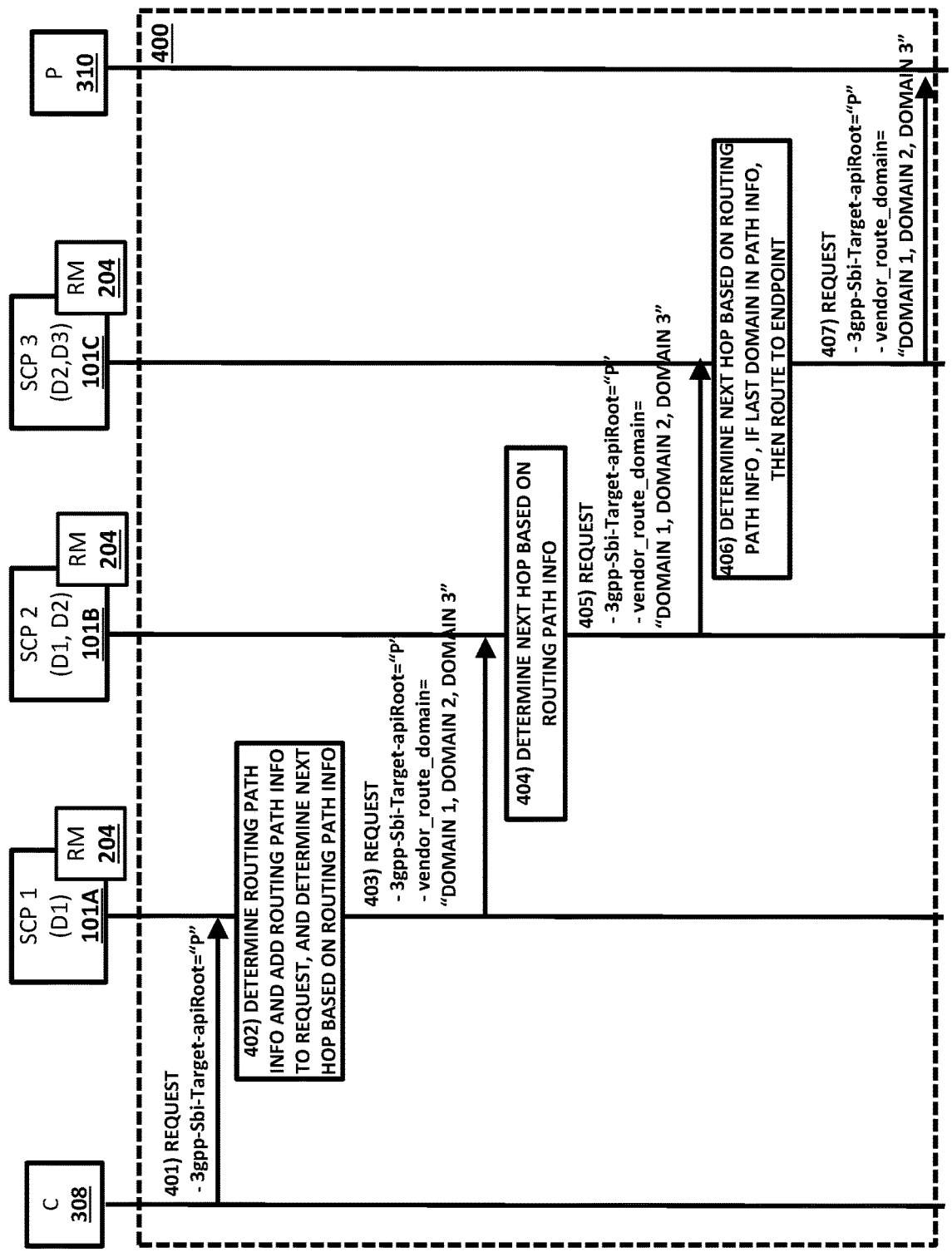
FIG. 4 is a message flow diagram illustrating an example scenario involving routing a request via SCPs according to the first network configuration.

FIG. 4 is a message flow diagram illustrating an example scenario 400 involving routing a request via SCPs 101A-101C according to network configuration 300. In some embodiments, each of SCPs 101A-101C may include RM 204 or related functionality. For example, SCP 101A or RM 204 therein may be configured to check whether a request (e.g., an SBI service request) includes routing path information (e.g., a text string indicating a sequence of domains, like "DOMAIN 1, DOMAIN 2, DOMAIN 3") and, if so, may use the routing path information when making a next hop determination. In this example, if the request is lacking routing path information, SCP 101A or RM 204 therein may be configured to determine routing path information based on SCP domain routing information and add the routing path information (e.g., information indicating a sequence of domains) to the request (e.g., in a custom header) such that a subsequent SCP (e.g., SCP 1018) can use the included routing path information when making a next hop determination for the request.

Referring to FIG. 4, in step 401, consumer NF 308 may send, to SCP 101A, a request (e.g., an SBI service request) for requesting a service or related data from producer NF 310. For example, the request may include a "3gpp-Sbi-Target-apiRoot" parameter indicating producer NF 310.

In step 402, SCP 101A may receive the request, determine that the request is lacking routing path information, determine the routing path information for the request, add the routing path information to the request, and then determine a next hop for the request based on the routing path information. For example, when determining an inter-domain routing path for routing a request to producer NF 310, SCP 101A may need to perform a reverse lookup using an "3gpp-Sbi-Target-apiRoot" parameter indicating producer NF 310 to determine the producer NF's domain information from its NfProfile registered at NRF 100. In this example, after determining that producer NF 310 is in "DOMAIN 3" and using SCP domain routing information associated with network configuration 300, SCP 101A or RM 204 therein (located in "DOMAIN 1") may determine that "DOMAIN 3" is routable from "DOMAIN 2" only. In this example, SCP 101A or RM 204 therein may use this knowledge to generate a sequence of domains (e.g., "DOMAIN 1, DOMAIN 2, DOMAIN 3") for routing the request (starting at the local domain of SCP 101A and ending at the domain of producer NF 310) and then include the sequence of domains in the request, e.g., as "vendor_route_domain" header information. Continuing with this example, SCP 101A or RM 204 therein may select SCP 101B as a next hop because SCP 101B serves "DOMAIN 2" and can be reached by SCP 101A.

In step 403, SCP 101A may send the request including the routing path information to SCP 101B. For example, the request may include a "3gpp-Sbi-Target-apiRoot" parameter indicating producer NF 310 and a "vendor_route_domain" header indicating a sequence of domains (e.g., "DOMAIN 1, DOMAIN 2, DOMAIN 3") for routing the request to producer NF 310.

In step 404, SCP 101B may receive the request, determine that the request includes routing path information, and determine a next hop for the request based on the routing path information. For example, after receiving a request with routing path information, SCP 101B or RM 204 therein may search a sequence of domains (indicated by the routing path information) in a reverse order (e.g., "DOMAIN 3, DOMAIN 2, DOMAIN 1" instead of "DOMAIN 1, DOMAIN 2, DOMAIN 3"), for a domain that matches one of the local domains (e.g., serving domains) of SCP 101B (e.g., "DOMAIN 2"). In this example, after the domain of SCP 101B is found in the sequence of domains, SCP 101B or RM 204 therein may revert the search order (e.g., back to "DOMAIN 1, DOMAIN 2, DOMAIN 3") to determine the next domain (e.g., the domain after "DOMAIN 2", i.e., "DOMAIN 3") in the sequence of domains. Continuing with this example, SCP 101B or RM 204 therein may select SCP 101C as a next hop because SCP 101C serves "DOMAIN 3" and can be reached by SCP 101B.

In step 405, SCP 101B may send the request including the routing path information to SCP 101C. For example, the request may include a "3gpp-Sbi-Target-apiRoot" parameter indicating producer NF 310 and a "vendor_route_domain" header indicating a sequence of domains (e.g., "DOMAIN 1, DOMAIN 2, DOMAIN 3") for routing the request to producer NF 310.

In step 406, SCP 101C may receive the request, determine that the request includes routing path information, and determine a next hop for the request based on the routing path information. For example, after receiving a request with routing path information, SCP 101C or RM 204 therein may search a sequence of domains (indicated by the routing path information) in a reverse order (e.g., "DOMAIN 3, DOMAIN 2, DOMAIN 1" instead of "DOMAIN 1, DOMAIN 2, DOMAIN 3"), for a domain that matches one of the local domains (e.g., serving domains) of SCP 101C (e.g., "DOMAIN 3"). In this example, after the domain of SCP 101C is found in the sequence of domains, SCP 101C or RM 204 therein may determine that its local domain matches the last domain listed in the routing path information and, as such, may determine that the next hop for the request is producer NF 310 (e.g., because producer NF 310 is within "DOMAIN 3".

In step 407, SCP 101C may send the request to producer NF 310. In some embodiments, the request may include a "3gpp-Sbi-Target-apiRoot" parameter indicating producer NF 310 and a "vendor_route_domain" header indicating a sequence of domains (e.g., "DOMAIN 1, DOMAIN 2, DOMAIN 3") for routing the request to producer NF 310. In some embodiments, prior to routing the request to producer NF 310, SCP 101C or RM 204 therein may remove the routing path information or otherwise modify the routing path information.

It will be appreciated that FIG. 4 is for illustrative purposes and that different and/or additional messages and/or actions may be used. It will also be appreciated that various messages and/or actions described herein related to scenario 400 may occur in a different order or sequence.

Figure 5:
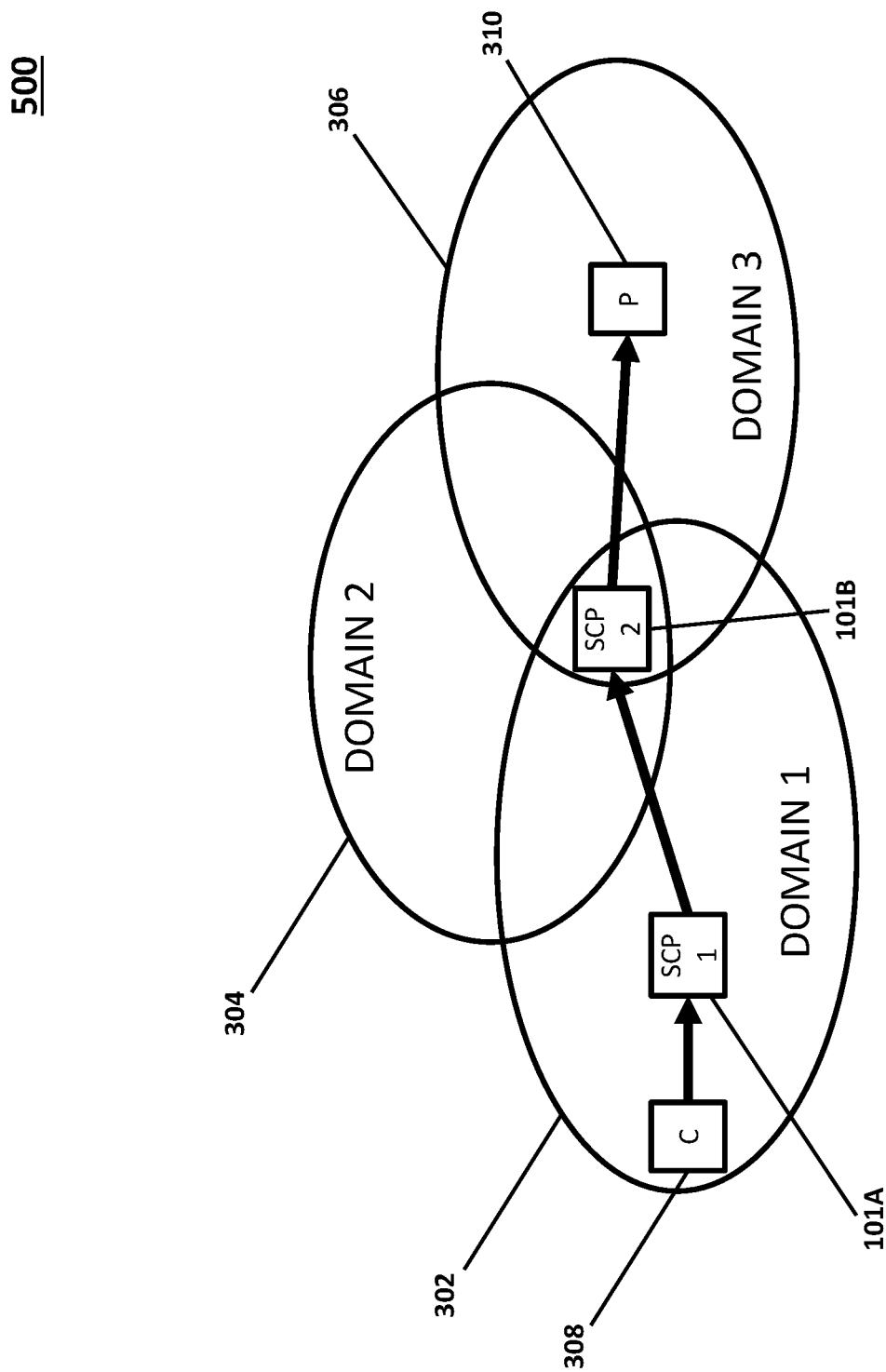
FIG. 5 depicts SCPs and related domains associated with a second network configuration.

FIG. 5 depicts SCPs and related domains associated with a second network configuration 500. As depicted in FIG. 5, network configuration 500 may represent a network with multiple domains (e.g., SCP domains) for SCP routing purposes, including domain 1 302, domain 2 304, and domain 3 306. Each of domains 302-306 may represent a logical network portion and may be associated with one or more of SCPs 101A-101B. For example, SCPs 101A-101B may be configured to route traffic to producer NFs or other entities (e.g., other SCPs 101) within its local domain(s), also referred to herein as serving domain(s).

Referring to network configuration 500, domain 302 includes a consumer NF (labeled as 'C') 308 and is served by SCP 101A and SCP 101B; domain 304 is served by SCP 101B; and domain 306 includes a producer NF (labeled as 'P') 310 and is only served by served by SCP 101B. In other words, as depicted in FIG. 5, SCP 101A is connected to domain 304 and SCP 101B is connected to domain 302 and domain 306.

Assuming SCPs 101A-101B and their domain connectivity information as depicted in FIG. 5 are registered with NRF 100, representative SCP domain routing information from NRF 100 may include or indicate an "scpDomainList" resource or object as follows:

```
"scpDomainList": {
"DOMAIN 1": { "connectedScpDomainList":
[ "DOMAIN 2", "DOMAIN 3" ] },
"DOMAIN 2": { "connectedScpDomainList":
[ "DOMAIN 1", "DOMAIN 3" ] },
"DOMAIN 3": { "connectedScpDomainList":
[ "DOMAIN 1", "DOMAIN 2" ] },
}.
```

It will be appreciated that FIG. 5 is for illustrative purposes and that different and/or additional SCPs 101 than SCPs 101A-101B depicted in FIG. 5 may be usable for routing service requests.

Figure 6:
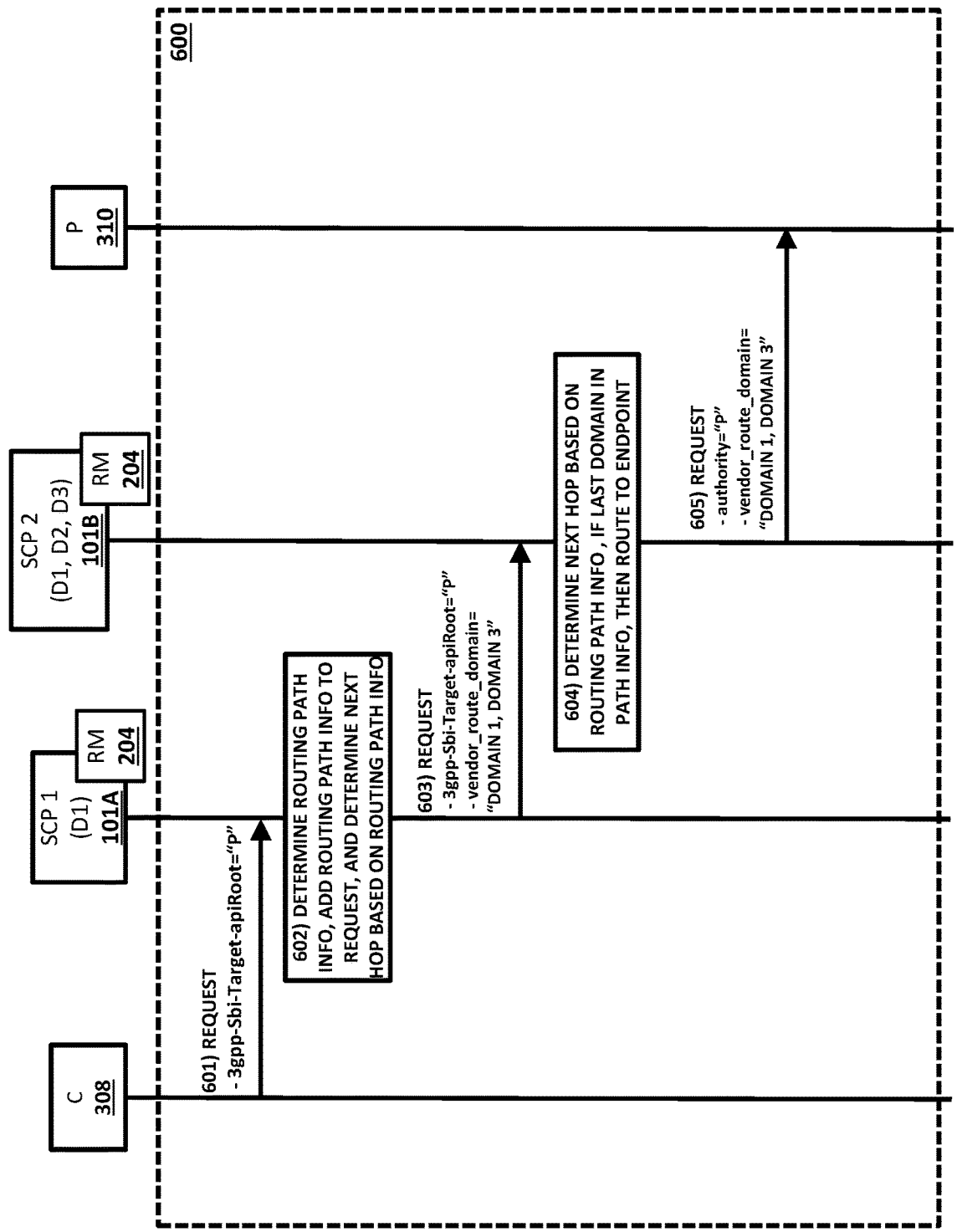
FIG. 6 is a message flow diagram illustrating an example scenario involving routing a request via SCPs according to the second network configuration.

FIG. 6 is a message flow diagram illustrating an example scenario 600 involving routing a request via SCPs 101A-101B according to network configuration 300. In some embodiments, each of SCPs 101A-101B may include RM 204 or related functionality. For example, SCP 101A or RM 204 therein may be configured to check whether a request (e.g., an SBI service request) includes routing path information (e.g., a text string indicating a sequence of domains, like "DOMAIN 1, DOMAIN 3") and, if so, may use the routing path information when making a next hop determination. In this example, if the request is lacking routing path information, SCP 101A or RM 204 therein may be configured to determine routing path information based on SCP domain routing information and add the routing path information to the request (e.g., in a custom header) such that a subsequent SCP (e.g., SCP 101B) can use the included routing path information when making a next hop determination for the request.

Referring to FIG. 6, in step 601, consumer NF 308 may send, to SCP 101A, a request (e.g., an SBI service request) for requesting a service or related data from producer NF 310. For example, the request may include a "3gpp-Sbi-Target-apiRoot" parameter indicating producer NF 310.

In step 602, SCP 101A may receive the request, determine that the request is lacking routing path information, determine the routing path information for the request, add the routing path information to the request, and then determine a next hop for the request based on the routing path information. For example, when determining an inter-domain routing path for routing a request to producer NF 310, SCP 101A may need to perform a reverse lookup using an "3gpp-Sbi-Target-apiRoot" parameter indicating producer NF 310 to determine the producer NF's domain information from its NfProfile registered at NRF 100. In this example, after determining that producer NF 310 is in "DOMAIN 3" and using SCP domain routing information associated with network configuration 300, SCP 101A or RM 204 therein (located in "DOMAIN 1") may determine that "DOMAIN 3" is routable from "DOMAIN 1" but not directly from SCP 101A. In this example, SCP 101A or RM 204 therein may use this knowledge to generate a sequence of domains (e.g., "DOMAIN 1, DOMAIN 3") for routing the request (starting at the local domain of SCP 101A and ending at the domain of producer NF 310) and then include this sequence of domains in the request, e.g., as "vendor_route_domain" header information. Continuing with this example, SCP 101A or RM 204 therein may select SCP 101B as a next hop because SCP 101B serves "DOMAIN 3" and can be reached by SCP 101A.

In step 603, SCP 101A may send the request including the routing path information to SCP 101B. For example, the request may include a "3gpp-Sbi-Target-apiRoot" parameter indicating producer NF 310 and a "vendor_route_domain" header indicating a sequence of domains (e.g., "DOMAIN 1, DOMAIN 3") for routing the request to producer NF 310.

In step 604, SCP 101B may receive the request, determine that the request includes routing path information, and determine a next hop for the request based on the routing path information. For example, after receiving a request with routing path information, SCP 101B or RM 204 therein may search a sequence of domains (indicated by the routing path information) in a reverse order (e.g., "DOMAIN 3, DOMAIN 1" instead of "DOMAIN 1, DOMAIN 3"), for a domain that matches one of the local domains (e.g., serving domains) of SCP 101B (e.g., "DOMAIN 3"). In this example, after the domain of SCP 101B is found in the sequence of domains, SCP 101B or RM 204 therein may determine that its local domain matches the last domain listed in the routing path information and, as such, may determine that the next hop for the request is producer NF 310 (e.g., because producer NF 310 is within "DOMAIN 3".

In step 605, SCP 101B may send the request to producer NF 310. In some embodiments, the request may include a "3gpp-Sbi-Target-apiRoot" parameter indicating producer NF 310 and a "vendor_route_domain" header indicating a sequence of domains (e.g., "DOMAIN 1, DOMAIN 3") for routing the request to producer NF 310. In some embodiments, prior to routing the request to producer NF 310, SCP 101B or RM 204 therein may remove the routing path information or otherwise modify the routing path information.

It will be appreciated that FIG. 6 is for illustrative purposes and that different and/or additional messages and/or actions may be used. It will also be appreciated that various messages and/or actions described herein related to scenario 600 may occur in a different order or sequence.

Figure 7:
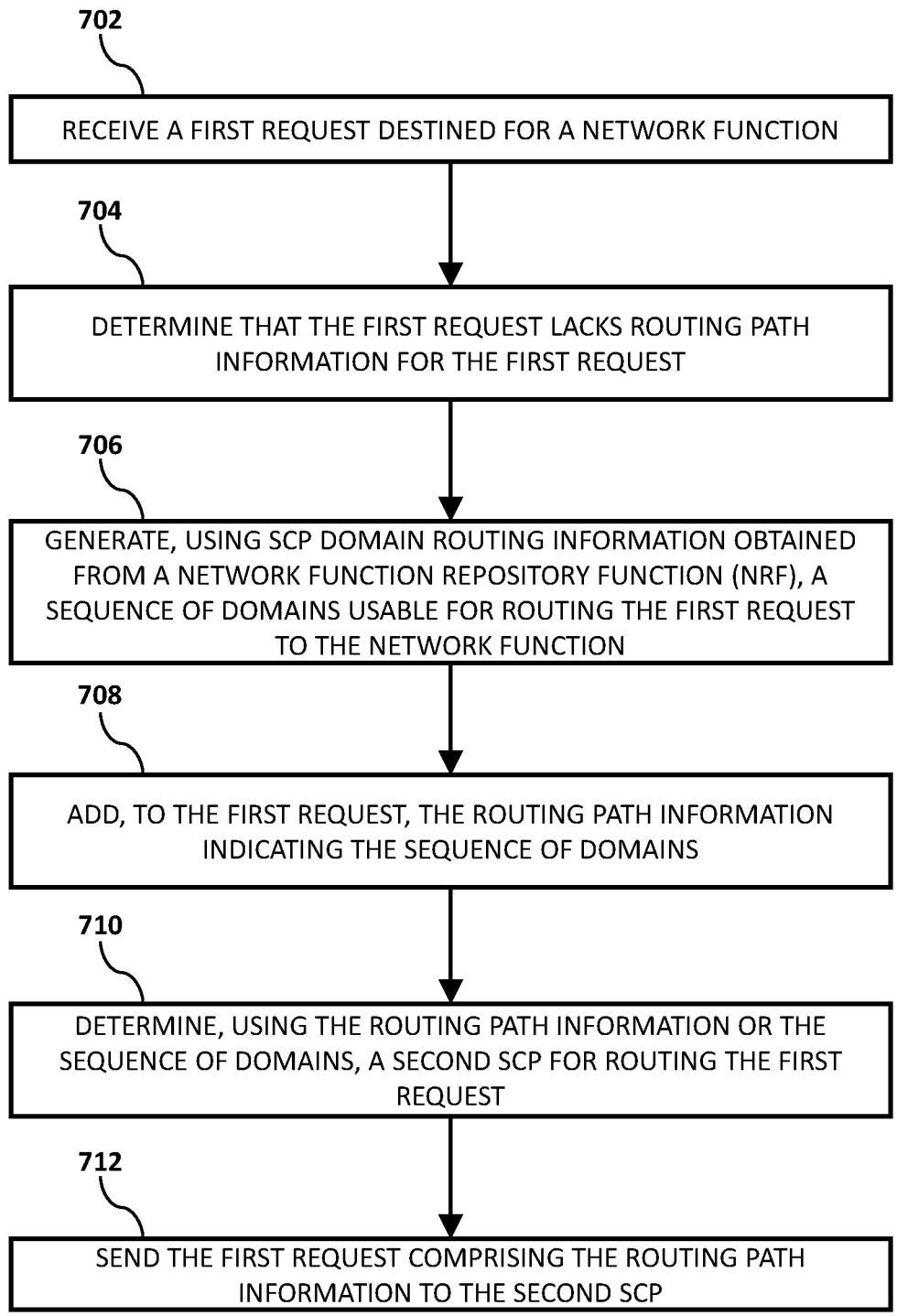
FIG. 7 is a flow chart illustrating an example process for SCP routing.

FIG. 7 is a diagram illustrating an example process 700 for SCP routing. In some embodiments, example process 700 described herein, or portions (e.g., operations or steps) thereof, may be performed at or performed by SCP 101, RM 204, and/or a module or node. For example, process 700 may be performed by SCP 101A or RM 204 therein in "DOMAIN 1".

Referring to process 700, in step 702, a first request destined for an NF (e.g., producer NF 310) may be received. For example, a request may be received at SCP 101A that is in or associated with a different domain than the domain of producer NF 310 to which the request is destined.

In step 704, it may be determine that the first request lacks routing path information (e.g., inter-domain routing path information) for the first request. In some embodiments, determining that a first request lacks routing path information for the first request includes determining that the first request lacks a custom header (e.g., a "vendor_route_domain" header) containing routing path information.

In some embodiments, determining that a first request lacks routing path information for the first request may include receiving a routing failure indication after attempting to route the first request using the routing path information. For example, if routing fails when attempting to use routing path information in a request, SCP 101B or RM 204 therein may be configured to derive or determine new routing path information and replace the old routing path information with the new routing path information (prior to routing the first request onward).

In step 706, a sequence of domains usable for routing the first request to the NF (e.g., producer NF 310) may be generated using SCP domain routing information obtained from NRF 100. For example, when determining an inter-domain routing path for routing a request to producer NF 310, SCP 101A may perform a reverse lookup using an "3gpp-Sbi-Target-apiRoot" parameter indicating producer NF 310 to determine the producer NF's domain information from its NfProfile registered at NRF 100. In this example, SCP 101A may request, from NRF 100, SCP domain routing information and use the SCP domain routing information to generate the routing path to the domain of producer NF 310.

In step 708, the routing path information indicating the sequence of domains may added to the first request. For example, a sequence of domains representing a local domain of the SCP generating the routing path information (e.g., SCP 101A) to the final domain where a destination NF (e.g., producer NF 310) for the request resides may be added in a "vendor_route_domain" header as a text string, e.g., "DOMAIN 1, DOMAIN 2, DOMAIN 3".

In step 710, it may be determined, using the routing path information or the sequence of domains, a second SCP (e.g., SCP 101B or 101C) for routing the first request; and In step 712, the first request comprising the routing path information may be sent to the second SCP.

In some embodiments, an SCP (e.g., SCP 101A or SCP 101B) may be configured for: receiving a second request comprising routing path information; determining that the second request may include routing path information for the second request; determining, using the routing path information and a first domain (e.g., a local domain) associated with the SCP, a next domain for routing the second request; and sending the second request to another SCP (e.g., SCP 101C) associated with the next domain.

In some embodiments, determining, using routing path information indicating a sequence of domains and a first domain (e.g., a local domain) associated with a SCP, the next domain for routing a request may include identifying, by searching the sequence of domains in a reverse order (e.g., right to left or finish to start), a matching domain in the sequence that matches the first domain associated with the first SCP; and after identifying the matching domain, determining, using the original order (e.g., left to right or start to finish), the next domain in the sequence of domains after the matching domain.

In some embodiments, an SCP (e.g., SCP 101B or SCP 101C) may be configured for: receiving a third request comprising routing path information; determining that the third request may include routing path information for the second request; determining, using the routing path information and a first domain (e.g., a local domain) associated with the SCP, that the first domain may be the last domain indicated by the routing path information; and sending the third request to an NF (e.g., producer NF 310) in the first domain.

In some embodiments, an SCP (e.g., SCP 101B) may be configured for performing a routing decision using the routing path information.

In some embodiments, an SCP (e.g., a conventional SCP without domain routing path information awareness) may be configured for performing the routing decision without using the routing path information in the first request.

In some embodiments, determining that a first request lacks routing path information for the first request may include receiving a routing failure indication after attempting to route the first request using the routing path information. For example, if routing fails when attempting to use routing path information in a request, SCP 101B or RM 204 therein may be configured to derive new routing path information and replace the old routing path information with the new routing path information (prior to routing the first request onward).

In some embodiments, generating a sequence of domains for routing a first request may include determining a destination domain associated with the NF that the first request is destined (e.g., by performing a reverse lookup using an "3gpp-Sbi-Target-apiRoot" parameter in the first request to determine the producer NF's domain information from its NfProfile registered at NRF 100); obtaining SCP domain routing information using a SCPDomainRoutingInfoGet or SCPDomainRoutingInfoSubscribe service associated with NRF 100; and determining the sequence of domains based on one or more domains that the first request must traverse to reach the destination domain from a first domain. In some embodiments, a routing path information may be in a header portion, an HTTP header, a custom header, or a vendor-_route_domain header of the first request.

In some embodiments, a first request may include an SBI request or an HTTP request. For example, an SBI request may be sent by consumer NF 308 to SCP 101A for routing to producer NF 310.

It will be appreciated that process 700 is for illustrative purposes and that different and/or additional messages may be communicated and/or actions may be performed. It will also be appreciated that various messages and/or actions described herein may occur in a different order or sequence.

It will be appreciated that while some aspects of the subject matter described herein has been discussed with reference to 5G networks various networks may utilize some aspects of the subject matter described herein. For example, any network that allows or utilizes SCP or similar functions may use features, systems, mechanisms, and/or techniques described herein to perform SCP routing.

It should be noted that SCP 101, RM 204, and/or functionality described herein may constitute a special purpose computing device. Further, SCP 101, RM 204, and/or functionality described herein can improve the technological field of network communications. For example, SCP 101 may include RM 204 and may be capable of adding routing path information indicating a sequence of domains in a service request that is being routed between domains. In this example, a receiving SCP 101 (e.g., an intermediate SCP 101) may use the routing path information for efficiently informing a routing decision, e.g., a next hop determination, e.g., without performing other routing logic that involves analyzing obtained SCP domain routing information from NRF 100.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.500; 3rd Generation Partnership Project; Technical Specification Group Core Network and Terminals; 5G System; Technical Realization of Service Based Architecture; Stage 3 (Release 16); V16.9.0 (2021-12).
2. 3GPP TS 29.510; 3rd Generation Partnership Project; Technical Specification Group Core Network and Terminals; 5G System; Network Function Repository Services; Stage 3 (Release 17); V17.2.0 (2021-12).
3. 3GPP TS 29.501; 3rd Generation Partnership Project; Technical Specification Group Services and System Aspects; System Architecture for the 5G System (5GS); Stage 2 (Release 17); V17.3 (2021-12)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for inter-service communication proxy (SCP) routing, the method comprising:
   at a first service communication proxy (SCP) associated with a first domain, the first SCP including at least one processor:
      receiving, by the first SCP, a first request destined for a producer network function (NF);
      determining, by the first SCP, that the first request lacks a list comprising a sequence of domain identifiers identifying, in sequence, domains for routing the first request to the producer NF;
      determining, by the first SCP, a domain associated with the producer NF;
      determining, by the first SCP and using the domain associated with the producer NF, the list comprising the sequence of domain identifiers identifying, in sequence, the domains for routing the first request to the producer NF;
      adding, by the first SCP and to the first request, the list comprising the sequence of domain identifiers identifying domains for routing the first request to the producer NF;
      determining, by the first SCP and using the list comprising the sequence of domain identifiers identifying the domains for routing the first request to the producer NF, a second SCP for routing the first request; and
      sending, by the first SCP and to the second SCP, the first request including the list comprising the sequence of domain identifiers identifying the domains for routing the first request to the producer NF; and
   at the second SCP:
      receiving, by the second SCP, the first request;
      reading, by the second SCP, the list comprising the sequence of domain identifiers in the first request;
      using, by the second SCP, the list comprising the sequence of domain identifiers to determine a next hop for the first request without contacting the NRF; and
      forwarding, by the second SCP, the first request to the next hop.

2. The method of claim 1 comprising:
   at the first SCP:
      receiving a second request including a list comprising a sequence of domain identifiers identifying, in sequence, domains for routing the second request to the producer NF;
      determining that the second request includes the list comprising the sequence of domain identifiers identifying the domains for routing the second request to the producer NF;
      determining, using the list comprising the sequence of domain identifiers identifying the domains for routing the second request to the producer NF and the first domain associated with the first SCP, a next domain for routing the second request to the producer NF; and
      sending the second request to a third SCP associated with the next domain.

3. The method of claim 2 wherein determining, using the list comprising the sequence of domain identifiers identifying the domains for routing the second request to the producer NF and the first domain associated with the first SCP, the next domain for routing the second request to the producer NF includes:
   identifying, by searching, in a reverse order, the list comprising the sequence of domain identifiers identifying the domains for routing the second request to the producer NF, for a domain in the list that matches the first domain associated with the first SCP; and
   after identifying the matching domain, determining, using the original order, the next domain in the list after the matching domain.

4. The method of claim 1 comprising:
   at the first SCP:
      receiving a third request including a list comprising a sequence of domain identifiers identifying, in sequence, domains for routing the third request to the producer NF;
      determining that the third request includes the list comprising the sequence of domain identifiers identifying, in sequence, the domains for routing the third request to the producer NF;
      determining, using the list comprising the sequence of domain identifiers identifying the domains for routing the third request to the producer NF and the first domain associated with the first SCP, that the first domain is the last domain in the list comprising the sequence of domain identifiers identifying the domains for routing the third request to the producer NF; and
      sending the third request to the producer NF.

5. The method of claim 1 wherein determining that the first request lacks the list comprising the sequence of domain identifiers identifying the domains for routing the first request to the producer NF includes receiving a routing failure indication after attempting to route the first request using the list comprising the sequence of domain identifiers identifying the domains for routing the first request to the producer NF.

6. The method of claim 1 wherein determining the list comprising the sequence of domain identifiers identifying the domains includes:
   obtaining the domain identifiers using an SCPDomainRoutingInfoGet or SCPDomainRoutingInfoSubscribe service associated with the NRF; and
   determining the list comprising the sequence of domain identifiers identifying the domains based on one or more domains that the first request must traverse to reach the domain of the producer NF from the first domain.

7. The method of claim 1 wherein adding the list comprising the sequence of domain identifiers to the first request includes adding the list to a header portion, a hypertext transfer protocol (HTTP) header, a custom header, or a vendor_route_domain header of the first request.

8. The method of claim 1 wherein the first request includes a service based interface (SBI) request or a hypertext transfer protocol (HTTP) request.

9. A system for inter-service communication proxy (SCP) routing, the system comprising:
  a first SCP including at least one processor and a memory; and
  a second SCP including at least one processor and a memory, wherein the first SCP is associated with a first domain and the first SCP is configured for:
    receiving a first request destined for a producer network function (NF);
    determining that the first request lacks a list comprising a sequence of domain identifiers identifying, in sequence, domains for routing the first request to the producer NF;
    determining, by the first SCP, a domain associated with the producer NF;
    determining, using the domain associated with the producer NF, the list comprising the sequence of domain identifiers identifying, in sequence, the domains for routing the first request to the producer NF;
    adding, to the first request, the list comprising the sequence of domain identifiers;
    determining, using the list comprising the sequence of domain identifiers, that the second SCP can reach a next domain in the list comprising the sequence of domains to which the first request should be forwarded; and
    sending the first request including the list comprising the sequence of domain identifiers to the second SCP, and
  wherein the second SCP is configured for:
    receiving the first request;
    reading the list comprising the sequence of domain identifiers in the first request;
    using the list comprising the sequence of domain identifiers to determine a next hop for the first request without contacting the NRF; and
    forwarding the first request to the next hop.

10. The system of claim 9 wherein the first SCP is configured for:
  receiving a second request including a sequence of domain identifiers identifying, in sequence, domains for routing the second request to the producer NF;
  determining that the second request includes the list comprising the sequence of domain identifiers identifying, in sequence, the domains for routing the second request to the producer NF;
  determining, using the list comprising the sequence of domain identifiers identifying the domains for routing the second request to the producer NF and the first domain associated with the first SCP, a next domain for routing the second request to the producer NF; and
  sending the second request to a third SCP associated with the next domain.

11. The system of claim 10 wherein the first SCP is configured for determining the next domain for routing the second request to the producer NF by:
  identifying, by searching, in a reverse order, the list comprising the sequence of domain identifiers identifying the domains for routing the second request to the producer NF, for a domain in the list that matches the first domain associated with the first SCP; and
  after identifying the matching domain, determining, using the original order, the next domain in the list after the matching domain.

12. The system of claim 9 wherein the first SCP is configured for:
  receiving a third request including a list comprising a sequence of domain identifiers identifying, in sequence, domains for routing the third request to the producer NF;
  determining that the third request includes the list comprising the sequence of domain identifiers identifying, in sequence, the domains for routing the third request to the producer NF;
  determining, using the list comprising the sequence of domain identifiers identifying the domains for routing the third request to the producer NF and the first domain associated with the first SCP, that the first domain is the last domain in the list comprising the sequence of domain identifiers identifying the domains for routing the third request to the producer NF; and
  sending the third request to the producer NF.

13. The system of claim 9 wherein the second SCP is configured for determining that the first request lacks the list including the sequence of domain identifiers identifying the domains for routing the first request to the producer NF by receiving a routing failure indication after attempting to route the first request using the list comprising the sequence of domain identifiers identifying the domains for routing the first request to the producer NF.

14. The system of claim 9 wherein the first SCP is configured for:
  obtaining the SCP identifiers using an SCPDomainRoutingInfoGet or SCPDomainRoutingInfoSubscribe service associated with the NRF; and
  determining the sequence of domains based on one or more domains that the first request must traverse to reach the destination domain from the first domain.

15. The system of claim 9 wherein the first request is received from a third SCP or a consumer NF.

16. The system of claim 9 wherein the the first SCP is configured to add the list including the sequence of domain identifiers to a header portion, a hypertext transfer protocol (HTTP) header, a custom header, or a vendor_route_domain header of the first request.

17. The system of claim 9 wherein the first request includes a service based interface (SBI) request or a hypertext transfer protocol (HTTP) request.

18. A non-transitory computer readable medium having stored thereon executable instructions that when executed by at least one processor of a computer cause at least one computer to perform steps comprising:
  at a first service communication proxy (SCP) associated with a first domain:
    receiving, by the first SCP, a first request destined for a producer network function (NF);
    determining, by the first SCP, that the first request lacks a list comprising a sequence of domain identifiers identifying, in sequence, domains for routing the first request to the producer NF;

determining, by the first SCP, a domain associated with the producer NF;

determining, by the first SCP and using the domain associated with the producer NF, the list comprising the sequence of domain identifiers identifying, in sequence, domains for routing the first request to the producer NF;

adding, by the first SCP and to the first request, the list comprising the sequence of domain identifiers identifying the domains for routing the first request to the producer NF;

determining, by the first SCP and using the list comprising the sequence of domain identifiers identifying the domains for routing the first request to the producer NF, a second SCP for routing the first request; and sending, by the first SCP and to the second SCP, the first request including the list comprising the sequence of domain identifiers identifying the domains for routing the first request to the producer NF; and at the second SCP:

receiving, by the second SCP, the first request;

reading, by the second SCP, the list comprising the sequence of domain identifiers in the first request;

using, by the second SCP, the list comprising the sequence of domain identifiers to determine a next hop for the first request without contacting the NRF; and forwarding, by the second SCP, the first request to the next hop.

* * * * *

UNITED STATES PATENT AND TRADEMARK OFFICE
CERTIFICATE OF CORRECTION

| | | |
|---|---|---|
| PATENT NO. | : 12,323,316 B2 | Page 1 of 1 |
| APPLICATION NO. | : 17/710923 | |
| DATED | : June 3, 2025 | |
| INVENTOR(S) | : Krishan et al. | |

It is certified that error appears in the above-identified patent and that said Letters Patent is hereby corrected as shown below:

In the Specification

In Column 15, Line 19, delete "(2021-12)" and insert -- (2021-12). --, therefor.

In the Claims

In Column 18, Line 48, in Claim 16, delete "the the" and insert -- the --, therefor.

Signed and Sealed this
Twelfth Day of August, 2025

Coke Morgan Stewart
*Acting Director of the United States Patent and Trademark Office*